3,594,388
4-AMINO-5-(SUBSTITUTED PHENYL) FURAZAN
Claude Lehmann, Ernst Renk, and André Gagneux, Basel, Switzerland, assignors to Geigy Chemical Corporation, Ardsley, N.Y.
No Drawing. Filed Feb. 2, 1968, Ser. No. 702,551
Claims priority, application Switzerland, Feb. 7, 1967, 1,894/67
Int. Cl. C07d 85/56
U.S. Cl. 260—307
9 Claims

ABSTRACT OF THE DISCLOSURE

The compounds are of the class of furazan derivatives, more particularly 4-amino-5-phenyl furazan derivatives wherein the phenyl ring is further substituted. The compounds are useful as anticonvulsive, muscle-relaxing agents and agents depressing the central nervous system (CNS). An illustrative embodiment is 3-amino-4-($\alpha,\alpha,\alpha$-trifluoro-o-tolyl) furazan.

The invention concerns new furazan derivatives, and pharmaceutical preparations which contain the new compounds and the use thereof. More particularly, the present invention relates to compounds of the general Formula I

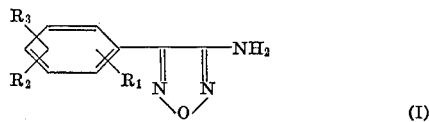

(I)

wherein $R_1$ is halogen, nitro or trifluoromethyl, lower alkoxy or lower alkylthio,
$R_2$ is hydrogen, lower alkyl or lower alkoxy, and
$R_3$ is hydrogen or lower alkoxy.

Furthermore the present invention relates to novel methods and compositions containing a compound of the above-mentioned formula for effecting anticonvulsive, muscle-relaxing and CNS-depressing activities in warm-blooded animals, especially mammals. More particularly, the method of effecting anticonvulsive, muscle-relaxing and CNS-depressing activities in mammals is concerned with administering a compound as defined in the above formula in therapeutic doses.

According to this invention the scope of the substituents as defined in the above-mentioned formula may be characterized as follows:

The term "lower alkyl" as used herein alone or in "lower alkoxy" and "lower alkylthio" means straight or branched alkyl chains of the general formula $C_mH_{2m+1}$ wherein $m$ represents an integer of 5 or less. More particularly, such terms may be illustrated as follows: $R_1$ being halogen can mean chlorine, fluorine or bromine, $R_2$ being lower alkyl represents methyl, ethyl, propyl, isopropyl, butyl, isobutyl, sec. butyl, tert. butyl, pentyl, isopentyl or 2,2-dimethylpropyl; $R_1$, $R_2$ or $R_3$ being lower alkoxy can represent, methoxy, ethoxy, propoxy, isopropoxy, butoxy, isobutoxy, sec. butoxy, tert. butoxy, pentoxy, isopentoxy, and the 2,2-dimethyl-propoxy and $R_1$, being lower, represents methylthio, ethylthio, propylthio, isopropylthio, butylthio, isobutylthio, sec. butylthio, tert. butylthio, pentylthio, isopentylthio and the 2,2-dimethyl-propylthio. $R_1$, $R_2$ and $R_3$ can in o-, m-, or p-position.

To produce the compounds of general Formula I according to the invention, a compound of general Formula II

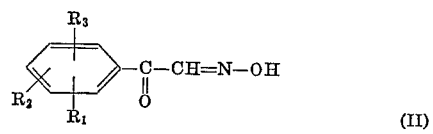

(II)

wherein $R_1$, $R_2$ and $R_3$ have the meanings given in Formula I, or an alkali metal salt of such a compound, is reacted with 2 mol equivalents of hydroxylamine.

Suitable alkali metal salts of compounds of general Formula II are, e.g. sodium and potassium salts. The reaction is preferably performed in a solvent and in the presence of a condensing agent. Particularly suitable solvents are those containing hydroxyl groups such as low alkanols and water. Suitable condensing agents are, e.g. alkali metal hydroxides such as sodium or potassium hydroxide, also alkaline earth metal hydroxides such as calcium or barium hydroxide, or carbonates corresponding to the alkali metal hydroxides mentioned. Preferably an excess of hydroxylamine is used as mineral acid salt, e.g. as hydrochloride, and the base is liberated by excess condensing agent.

Compounds of general Formula II the radicals $R_1$, $R_2$ and $R_3$ of which conform to the groups explicitly mentioned after Formula I as well as the alkali metal salts of such compounds are suitable as starting materials. These starting materials are produced, e.g. by reacting acetophenone substituted in the benzene nucleus by the radicals $R_1$, $R_2$ and $R_3$ with butyl nitrite in the presence of sodium ethylate in ethanol.

A compound of general Formula I is produced by a second process according to the invention by reacting a compound of general Formula III

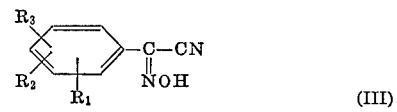

(III)

wherein $R_1$, $R_2$ and $R_3$ have the meanings given in Formula I, or an alkali metal salt of such a compound, with 2 mol equivalents of hydroxylamine.

Suitable alkali metal salts of compounds of general Formula III are, e.g. sodium and potassium salts. The reaction is preferably performed under the conditions given for the first process.

Compounds of general Formula III the radicals $R_1$, $R_2$ and $R_3$ of which conform to the groups mentioned under Formula I, and also alkali metals salts of such compounds are suitable as starting materials. These starting materials are produced, e.g. by reacting phenyl acetonitrile substituted in the benzene nucleus by the radicals $R_1$, $R_2$ and $R_3$ with butyl nitrite in the presence of sodium ethylate in ethanol.

Compounds of general Formula I are produced by a third process according to the invention by cyclising a compound of general Formula IV.

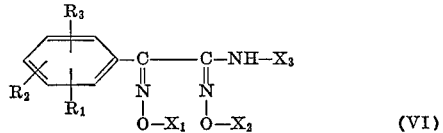

(VI)

wherein

X₁, X₂ and X₃ represent hydrogen or acyl radicals of an organic acid, particularly of a carboxylic acid, and R₁, R₂ and R₃ have the meanings given in Formula I, and, optionally, simultaneously hydrolysing. As acyl radical of a carboxylic acid, each of $X_1$, $X_2$ and $X_3$ can be, e.g. the acetyl or benzoyl radical. The reaction is preferably performed in a solvent and in the presence of a condensing agent. When $X_1$ and/or $X_2$ are each the acyl radical of a carboxylic acid or is an acyl radical and $X_3$ is a hydrogen atom or the acyl radical of a carboxylic acid, particularly suitable condensing agents are alkali metal hydroxides such as sodium or potassium hydroxide, also alkaline earth metal hydroxides such as calcium or barium hydroxide or carbonates corresponding to the alkali metal hydroxides mentioned. These condensing agents are advantageously used in a solvent containing hydroxyl groups, e.g. in water or in a low alkanol such as methanol or ethanol. Another condensing agent which can be used is phosphorous oxychloride; it is preferably used when $X_1$, $X_2$ and $X_3$ are hydrogen atoms.

Examples of compounds suitable as starting materials are those of general Formula IV the radicals $R_1$, $R_2$, $R_3$, $X_1$, $X_2$ and $X_3$ of which conform to the groups mentioned after the Formulae I and IV.

A group of such compounds is obtained, e.g. as follows: phenyl glyoxime substituted in the benzene ring by the radicals $R_1$, $R_2$ and $R_3$ is used as starting material. This is reacted with chlorine in glacial acetic acid to form a corresponding phenyl chloroglyoxime derivative which, with benzoyl chloride in abs. benzene, yields the corresponding O'-benzoyl-1-chloro-2-phenyl-glyoxime derivative. The 1-chloro compound obtained is converted with 6 N ammonia while splitting off hydrogen chloride into the O-benzoyl oxime of phenyl glyoxylamide oxime which is substituted in the benzene ring by the radicals $R_1$, $R_2$ and $R_3$.

According to another process the compounds of the general Formula I are produced, according to the invention, by reducing a compound of the general Formula Va or Vb.

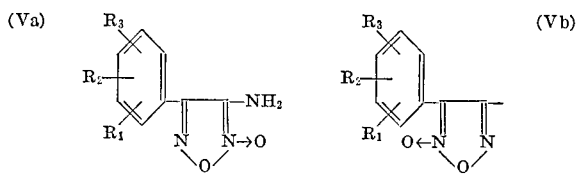

wherein $R_1$, $R_2$ and $R_3$ have the meaning given above for Formula I.

The reduction is preferably carried out using zinc in dilute acetic acid or using stannous chloride in a mixture of acetic acid and hydrochloric acid. Acetic acid can serve as sole reaction medium or it may be diluted with organic solvents such as dioxan or a low molecular alkanol.

The starting material for this process,, 3-amino-4-phenyl-furoxan having the general Formula Va can be prepared in a simple manner by oxidising a 1-amino-2-phenyl-glyoxime which is substituted in its benzene nucleus by $R_1$, $R_2$ and $R_3$. Suitable oxidising agents are aqueous solutions of halogens, such as bromine and chlorine or also potassium ferricyanide solutions. The 3-amino-4-phenyl-furoxans can also be prepared by reacting a phenylglyoxime whose benzene nucleus is substituted by $R_1$, $R_2$ or $R_3$ with ammonia and potassium ferricyanide in an aqueous solution.

The 3-amino-4-phenyl-furoxanes of the general Formula Va thus obtained are transformed completely into the isomeric 4-amino-3-phenyl-furoxans, when heated or irradiated by ultra-violet light.

As pointed out above, the compounds of the present invention, i.e. compounds of the above-described general Formula I possess valuable pharmacological and therapeutic properties and may be used in the form of pharmaceutical compositions, especially as anticonvulsive, muscle-relaxing, and CNS-depressing agents. Consequently these compounds of Formula I can be used for the treatment of mild states of excitement and for the relief of muscular stiffness, e.g. rheumatic diseases, fibrositis, bursitis, myositis, spondylitis, disc lesions, and torticollis.

The toxicity of the compounds of the instant invention is low: for instance, the $LD_{50}$ of 3-amino-4-($\alpha,\alpha,\alpha$-trifluoro-m-tolyl)furazan administered orally to mice is higher than 2000 mg./kg., administered orally to rats higher than 3000 mg./kg. In case of 3-amino-4-(o-chlorophenyl)furazan, the $LD_{50}$ was higher than 1000 mg./kg. in rats on oral administration.

The muscle-relaxing and CNS-depressing activities were studied in the intact, anaesthetized cat by determining the monosynaptic patellar tendon reflex and the polysynaptic flexor reflex. Procedure: Tracheotomy is performed on cats weighing 2.5 to 3 kg. under chloralose-urethane anaesthesia (chloralose 55 mg./kg. i.p. as a 3% solution in 20% urethane). The test substance in 5% propylene glycol solution is injected within 3 minutes into the jugular vein.

Patellar tendon reflex

After the femur has been fixed, the contraction of the quadriceps femoris muscle of the right hind leg is induced by hitting the patellar tendon with an automatic hammer at 10 second intervals. The contraction is recorded isotonically. The maximum change in amplitude is determined as a percentage related to the amplitude of the muscle contractions before administration of the test compound.

Flexor reflex

The contractions of the tibialis anterior muscle of the left hind leg are recorded isotonically after sub-maximal electrical stimulation of the central section of the severed tibial nerve. Sub-maximal stimulation is effected with single rectangular current impulses (Grass stimulator, duration of stimulation: 2 msec., voltage 0.5–5.0 v.). The interval between two stimulations is 10 seconds. The maximum change in amplitude is determined in percent related to the amplitude of the muscle contractions before administration of the test compound.

The results are given in the following table:

TABLE I

| Compound administered | Dosage, mg./kg. i.v. | Minimum change of amplitude, percent | |
|---|---|---|---|
| | | Reflex of patellar tendon | Reflex of flexor |
| 3-amino-4-($\alpha,\alpha,\alpha$-trifluoro-m-tolyl) furazan. | 38 | {First about +10 Later about −20} | About −100. |
| 3-amino-4-(o-chlorophenyl) furazan. | 5.8 | About −10 | Do. |

The anti-convulsive activity of the compounds of the present invention are determined by means of the electroshock test (partial suppression).

Another characteristic property of the central muscle relaxants is their anti-convulsant effect. This effect of the test compound can be demonstrated as follows:

Male white rats weighing 120–150 g. are used for the test. The electrodes are applied to the external ears. An alternating current of 50 c./s. and 100 v. is used for the electroshock and the stimulation lasts 0.63 second. The test compound is administered by mouth 1 hour before the electroshock. The dose which prevents tonic convulsions in the hind legs in 50% of the animals is ascertained by interpolation on the probability graph (Schleicher and Schüll No. 298½), (E.D.₅₀).

The results are given in the following table:

TABLE II

Compound administered: $E.D._{50}$ in mg./kg. p.o.

3 - amino-4-($\alpha,\alpha,\alpha$ - trifluoro-m-tolyl) furazan _____ about 40

3-amino-4-(o-chlorophenyl) furazan _____ about 10

The compounds of the present invention may be used for the treatment of warm-blooded animals, particularly mammals, in form of pharmaceutical compositions containing the compounds in admixture or conjunction with a pharmaceutical organic or inorganic, solid or liquid carrier for oral, rectal, or parenteral administration. The total daily doses can vary from about 5 mg./kg. to about 100 mg./kg., preferably about 10 mg./kg. to about 25 mg./kg. depending on the mammal and condition.

The preferred route of administration is the oral route. Suitable compositions include, without limitation, tablets, capsules, powders, solutions, suspensions, sustained release formulations and the like.

Dosage units for oral administration preferably contain between 60–90% of a compound of general Formula I as active substance. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives of gelatine, optionally with the addition of lubricants such as magnesium or calcium stearate or polyethylene glycols of suitable molecular weights, to form tablets or dragee (sugar coated tablet) cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings e.g. to distinguish between different dosages of active substance.

Dosage units for rectal administration are, e.g. suppositories which consist of a combination of the active substance with a suppository foundation mass. Suitable suppository foundation masses are natural or synthetic triglycerides, e.g. cocoa butter, also polyethylene glycols, e.g. Carbowax of suitable molecular weight, or higher fatty alcohols.

Dosage units for parenteral administration advantageously contain 1–10% active substance, water and also a solubility promoter or emulsifying agent. As solubility promoters or emulsifying agents, the following compounds for example can be used: propylene glycol, sodium benzoate or the sodium salt of a hydroxybenzoic acid, water soluble salts of bile acids such as sodium dehydrocholate, morpholine desoxycholate, ethanolamine cholate, inositphosphatide preparations and lecithin preparations which have a low oil content, optionally with partial glycerides of higher fatty acids such as mono- or di- olefin, and/or their polyoxyethylene derivatives. A dispersion of 1–5% active substance, 10–25% polyoxyethylene derivative of ricinoleic acid or its glycerides, e.g. the commercial product Cremophor El ®, is particularly suitable.

The following example further illustrates the production of tablets:

50.000 kg. of 3-amino-4-($\alpha,\alpha,\alpha$-trifluoro-m-tolyl)-furazan are mixed with 2.000 kg. of dried potato starch. The mass obtained is moistened with 1.200 kg. of stearic acid in 4 litres of ethanol and mixed for 15 minutes. 1.200 kg. of gelatine in 16 litres of distilled water are then added and the mass is kneaded for 20 minutes. As soon as it is sufficiently moist, it is granulated through a sieve (25 mesh/sq. cm.) and dried. The dried granulates are again sieved (60 mesh/sq. cm.) and then mixed for 1 hour with 4.000 kg. of potato starch, 1.200 kg. of talcum and 0.400 kg. of sodium carboxymethyl cellulose. The mass obtained is pressed into 100,000 tablets each weighing 600 mg., of which each contains 500 mg. of active substance.

The following examples illustrate the production of the new compounds of general Formula I and of hitherto undescribed intermediate products as well as pharmaceutical formulations but in no way limit the scope of the invention. The temperatures are given in degrees centigrade.

EXAMPLE 1

(a) First, a solution of 46.5 g. of potassium hydroxide in 125 ml. of water and then a solution of 46.5 g. of hydroxylamine hydrochloride in 125 ml. of water are added to 35.7 g. of the sodium salt of (p-chlorophenyl)-glyoxalaldoxime, which is produced according to Example 1(b). The solution obtained is then refluxed for 2.5 hours. A crystalline crude product precipitates from the reaction solution which, after cooling, is filtered off, washed with water and recrystallised from isopropanol/cyclohexane. 3-amino-4-(p-chlorophenyl)-furazan, M.P. 137–139° is obtained.

The sodium salt of (p-chlorophenyl)-glyoxalaldoxime required is produced as follows:

(b) 7.5 g. of sodium are dissolved in 150 ml. of abs. ethanol. The sodium ethylate solution formed is cooled in an ice bath and first 33.5 g. of butyl nitrite and then 50 g. of 4'-chloroacetophenone are added. An exothermic reaction occurs and a red salt precipitates. The reaction mixture is left to stand for another 1.5 hours in the ice bath and then for 15 hours at room temperature. The precipitated sodium salt of (p-chlorophenyl)-glyoxalaldoxime is filtered off, washed with a small amount of ethanol and a small amount of ether and dried in vacuo at room temperature.

EXAMPLE 2

(a) 12 g. of butyl nitrite and then 19.7 g. of ($\alpha,\alpha,\alpha$-trifluoro-o-tolyl)-acetonitrile are added to a solution of 2.52 g. of sodium in 60 ml. of abs. ethanol; these additions are made while cooling with ice. An exothermic reaction takes place and the solution becomes yellow coloured. After 15 minutes in the ice bath, the reaction mixture is left to stand for 3 hours at room temperature. The ethanol is then evaporated under vacuum at a bath temperature of 40°. The residue is dried by repeatedly dissolving it in benzene and then evaporating the benzene again under vacuum. The residue is then taken up in 150 ml. of water; the cloudy, aqueous solution is washed twice with ether, clarified with active charcoal and filtered. A pale yellow, aqueous solution containing the sodium salt of ($\alpha,\alpha,\alpha$-trifluoro-o-tolyl)-glyoxylonitrile oxime is obtained, to which 19.2 g. of potassium hydroxide and 19.2 g. of hydroxylamine hydrochloride are added in portions. The dissolved ether is then evaporated off from the reaction mixture and the remaining aqueous solution is refluxed for 3 hours. After cooling, the oil which has separated is extracted with ether. The organic phase is washed with water, dried with sodium sulphate, filtered and concentrated. A crystalline crude product is obtained which, recrystallised from benzene/cyclohexane, yields pure 3-amino-4-($\alpha,\alpha,\alpha$-trifluoro-o-tolyl)-furazan, M.P. 68–70°.

The starting material, ($\alpha,\alpha,\alpha$,-trifluoro-o-tolyl)-acetonitrile, is produced as follows:

(b) 30.1 g. of o-trifluoromethyl-benzyl alcohol [cf. R. Filler et al., J. Org. Chem. 25, 733 (1960)] are added dropwise within 8 hours to 60 ml. of refluxing thionyl chloride. The solution obtained is then evaporated under vacuum and the oil obtained is distilled under water jet vacuum. ($\alpha,\alpha,\alpha$-Trifluoro)-($\alpha'$-chloro)-o-xylene is obtained, B.P. 72–73°/15 torr.

(c) 15 ml. of dimethyl sulphoxide are added while stirring to 3.05 g. of sodium cyanide. 10.4 g. of ($\alpha,\alpha,\alpha$-trifluoro)-($\alpha'$-chloro)-o-xylene are added dropwise to the suspension obtained within 30 minutes. The reaction is exothermic and the temperature is kept below 35–40° by cooling with an ice bath. Stirring is continued for another half hour, the ice bath is replaced by a 40° warm oil bath, in which the mixture is stirred for another 2 hours at this temperature and then left to stand for 16 hours at room temperature. 50 ml. of water are added dropwise while stirring and cooling with ice and the emulsion formed is extracted three times with a mixture of ether and petroleum ether (1:1). The organic phases are washed twice with water, dried over sodium sulphate and evaporated. The oil obtained is distilled under water jet vacuum. ($\alpha,\alpha,\alpha$-Trifluoro-o-tolyl)-acetonitrile is obtained, B.P. 108–110°/18 torr.

EXAMPLE 3

The following end products are obtained analogously to Example 2:

(a) From (o-methoxyphenyl)-acetonitrile [cf. J. N. Chatterjea et al., J. Indian Chem. Soc. 33, 447 (1956)] by way of the sodium salt of (o-methoxyphenyl)-glyoxylonitrile oxime, 3-amino-4-(o-methoxyphenyl)-furazan, M.P. 112–114°;

(b) 3 - amino - 4 - (3,4,5-trimethoxyphenyl)-furazan, M.P. 174–175°, from (3,4,5-trimethoxyphenyl)-acetonitrile [cf. G. P. Schiemenz et al., Chem. Ber. 92, 1336 (1959)] by way of the sodium salt of (2,3,5-trimethoxyphenyl)-glyoxylonitrile oxime;

(c) 3 - amino - 4 - ($\alpha,\alpha,\alpha$-trifluoro-m-tolyl)-furazan, from ($\alpha,\alpha,\alpha$-trifluoro-m-tolyl)-acetonitrile [cf. B. E. Rosenkrantz et al., J. Chem. Eng. Data 8 (2), 237–238 (1963)] by way of the sodium salt of ($\alpha,\alpha,\alpha$-trifluoro-m-tolyl)-glyoxylonitrile oxime. After recrystallisation from cyclohexane/benzene and ether/petroleum ether, this compound melts at 88–89° or, in another crystal form, at 75–77°;

(d) 3 - amino - 4 - (o-fluorophenyl)-furazan, M.P. 114–116° (from isopropanol), from (o-fluorophenyl)-acetonitrile [cf. G. A. Olah et al., J. Org. Chem. 22, 879 (1957)] by way of the sodium salt of (o-fluorophenyl)-glyoxylonitrile oxime, and (e) 3 - amino - 4 - (o-chlorophenyl)-furazan, M.P. 53–55° (from benzene/cyclohexane), from (o-chlorophenyl)-acetonitrile [cf. J. F. Bunnett et al., J. Am. Chem. Soc. 83, 1691 (1961)] by way of the sodium salt of (o-chlorophenyl)-glyoxylonitrile oxime.

EXAMPLE 4

3 - amino - 4 - ($\alpha,\alpha,\alpha$-trifluoro-m-tolyl)-furazan is obtained analogously to Example 1 (a) from the sodium salt of ($\alpha,\alpha,\alpha$-trifluoro-m-tolyl)-glyoxalaldoxime with hydroxylamine.

The sodium salt mentioned is produced analogously to Example 1 (b) from 3'-trifluoromethyl-acetophenone and butyl nitrite.

EXAMPLE 5

4.0 g. of (o-nitrophenyl)-glyoxylonitrile oxime [cf. R. Perrot, Compt. rend. 199, 585 (1934)] are added to a solution of 7.8 g. of anhydrous sodium carbonate in 50 ml. of water. 3.75 g. of hydroxylamine hydrochloride are added to the solution obtained of the sodium salt of (o-nitrophenyl)-glyoxylonitrile oxime, the reaction mixture is refluxed for 1 hour and then cooled. On cooling, the oil which separates crystallises. The crystals are filtered off, washed with water and taken up in ether. The ether solution is dried over sodium sulphate and evaporated. The crystalline residue is recrystallised from isopropanol whereupon the 3-amino - 4 - (o-nitrophenyl)-furazan obtained melts at 111–112°.

EXAMPLE 6

(a) 0.5 g. of O-benzoyl oxime of 2-(p-chlorophenyl)-glyoxylamide oxime are dissolved in 10 ml. of saturated methanolic potassium carbonate solution. The solution obtained is left to stand for 30 minutes at room temperature, then evaporated and water is added. Crystals precipitate which are filtered off and dried in vacuo at 60°. The crude product obtained is recrystallised from isopropanol whereupon the 3-amino-4-(p-chlorophenyl)-furazan obtained melts at 137–139°.

The aqueous alkaline filtrate is acidified with 2 N hydrochloric acid and the acid suspension obtained is washed with ether to remove benzoic acid methyl ester formed. The isolated aqueous phase is neutralised with sodium hydrogen carbonate and extracted with ether. The ether extract is dried over sodium sulphate and evaporated. The residue is recrystallised from benzene/methanol and (p-chlorophenyl)-amino-glyoxime, M.P. 167–169°, is obtained as side product.

The starting material, O-benzoyl oxime of 2-(p-chlorophenyl)-glyoxylamide oxime, is produced as follows:

(b) 33 g. of (p-chlorophenyl)-glyoxime are dissolved in 250 ml. of glacial acetic acid. 12.9 g. of chlorine are introduced into this solution within 45 minutes. The reaction which begins is slightly exothermic and the rising of the temperature of the reaction mixture to over 15–25° is avoided by cooling with ice water when necessary. The mixture is stirred for another 4 hours at room temperature, then the cloudy solution is concentrated to a third of its volume and cooled to room temperature. The crude product crystallises. It is filtered off and purified by boiling in chloroform. The chloro-(p-chlorophenyl)-glyoxime obtained melts at 191–193°.

(c) 12.0 g. of the glyoxime derivative obtained according to Example 6(b) are stirred with 7.45 g. of benzoyl chloride and 15 ml. of abs. benzene for 1.5 hours at a bath temperature of 120°. A suspension is formed which is cooled to room temperature and filtered. The crystalline crude product obtained is washed with chloroform and then dried whereupon the crude O'-benzoyl-1-chloro-2-(p-chlorophenyl)-glyoxime melts at 170–175°.

(d) 5.5 g. of the monobenzoate obtained according to Example 6(c) are dissolved in 500 ml. of ether and 6.5 ml. of 6 N ammonia solution are added to the solution obtained while stirring vigorously. An emulsion is formed in this way which is stirred for 16 hours at room temperature. The mixture is then cooled in an ice bath, the precipitated crystals are filtered off, washed with water and dried in vacuo at 60°. The crude product obtained is recrystallised twice from isopropanol whereupon the O-benzoyl oxime of (p-chlorophenyl)glyoxylamide oxime is obtained which melts at 154–155°.

EXAMPLE 7

250 g. of furazan derivative of Formula I, 175.8 g. of lactose, and 169.7 g. of potato starch are mixed, the mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in and the mixture is pressed into 10,000 tablets each weighing 100 mg. and containing 25 mg. of the furazan derivative. If desired, the tablets can be grooved to enable better adaptation of the dosage instructions.

EXAMPLE 8

50 mg. to 300 mg. of 3-amino-4-($\alpha,\alpha,\alpha$-trifluoro-o-tolyl) furazan are introduced into a two-piece gelatin No. I capsule.

EXAMPLE 9

A solution of 615 mg. (3 millimol) 3-amino-4-(o-chlorophenyl)-furoxan in 50 ml. of glacial acetic acid is added with 4.5 ml. of a solution of $SnCl_2$ in acetic acid/hydrochloric acid (prepared according to Ber 50 (1917) 1539). This reaction mixture is left to stand for 48 hours at 20° and is then evaporated to dryness. The residue is added with 25 ml. of 5 N sodium hydroxide solution while being cooled in an ice bath and then extracted twice with 100 ml. of ether. The ethereal solution is dried over potassium carbonate and concentrated. The residue crystallises spontaneously. It consists of 3-amino - 4 - (o-chlorophenyl)-furazan, melting at 53–55°. It is identical with the substance obtained in Example 3(e) according to to its thin layer chromatogram, the NMR, IR and UV spectra.

The starting material 3-amino - 4 - (o-chlorophenyl)-furoxan is prepared as follows:

(a) An ice cold and well stirred solution of 28.7 g. of butyl nitrite in 260 ml. of ethanolic 1 N sodium ethylate solution is added slowly with 38.6 g. (0.25 mol) of (o-chlorophenyl)acetonitrile (see J. F. Bunnett et al., J. Am. Chem. Soc. 80 (1961) 1691). An exothermic reaction occurs and the temperature rises to about 40°.

After stirring for another hour at 20°, the reaction mixture is filtered and the filtrate is evaporated to dryness.

The filter residue and the evaporation residue are combined, dissolved in 200 ml. of ice-water and washed with ether. The aqueous solution is acidified with a small amount of 2 N hydrochloric acid whereby a precipitate forms. This is filtered, washed with water and dried. By recrystallising it from chloroform and ether, (o-chlorophenyl)-glyoxylonitriloxime, melting at 124° is obtained in 80% yield.

(b) A mixture of 1.8 g. (10 millimol) of the (o-chlorophenyl)-glyoxylonitriloxime obtained under (a), 3.5 g. (50 millimol) of hydroxylamine-hydrochloride and 4.2 g. of sodium bicarbonate in 50 ml. of water and 20 ml. of methanol is heated to 60° while stirring for 4 hours. The solution is then evaporated to dryness. The residue is extracted twice with 100 ml. of ether. The combined ether extracts are dried over magnesium sulphate, filtered and evaporated to dryness. The residue is recrystallised from 50 ml. of chloroform to give 1.7 g. (80% yield) of 1 - amino - 2 - (o - chlorophenyl) - α - glyoxime, melting at 150°. The thin layer chromatography and NMR-spectrum show that the substance contains about 5% of the β-isomer.

(c) A solution of 21.4 g. (0.1) of 1 - amino - 2 - (o-chlorophenyl) - α - glyoxime obtained under (b) in 214 ml. of 2 N sulphuric acid and 200 g. of ice, is stirred vigorously and added within 15 minutes with a solution of 5.1 ml. (16 g.) of bromine in 2 l. of ice water. A yellow solid precipitates, which is filtered and washed with ice water. It is then dissolved in a mixture of 100 ml. of ether and 150 ml. of ethyl-acetate. This solution is washed with 50 ml. of ice water, dried over magnesium sulphate, and concentrated in vacuo. The residue is recrystallised from benzene and cyclohexane to give in 70% yield 3-amino-4-(o-chlorophenyl)-furan, melting at 116°.

EXAMPLE 10

A solution of 715 mg. (3 millimol) of 3 - amino - 4 - (α,α,α - trifluoro - m - tolyl) - furoxan in 30 ml. of glacial acetic acid-dioxan 1:1 is stirred for 18 hours at 20°. The reaction mixture is then filtered, the residue is washed with a small amount of dioxan and the filtrate is evaporated to dryness. The residue is recrystallised from benzene to give in 65% yield 3-amino-4-(α,α,α-trifluoro-m-tolyl)-furazan melting at 87–89°. This substance is identical with the one obtained in Example 3(c) according to the NMR, IR and UV spectra and the thin layer chromatograms.

The starting material, 3 - amino - 4 - (α,α,α - trifluoro-m - tolyl) - furoxan is prepared as follows:

(a) Analogously to Example 9(a) (α,α,α - trifluoro - m-tolyl) - glyoxylonitriloxime, melting at 80° has been obtained, starting from (α,α,α - trifluoro - m - tolyl)-acetonitrile (see B. E. Rosenkrantz et al. J. Chem. Eng. Data 8 (2) (1963) 237–8).

(b) This is transformed analogously to the process described in Example 9(b) to give in 45% yield the 1-amino - 2 - (α,α,α - trifluoro - m - tolyl) - glyoxime, M.P. 131°.

(c) A solution of 1 - amino - 2 - (α,α,α - trifluoro - m-tolyl) - glyoxime obtained under (b) in 1100 ml. of 24% aqueous ammonia is added at 5% while stirring vigorously with a solution of 33 g. (0.1 mol) of potassium ferricyanide in 250 ml. of water. A white precipitate forms, which is filtered off and dissolved in 300 ml. of ether. The ethereal solution is washed with water, dried over magnesium sulphate and evaporated to dryness. On recrystallising the residue in carbon tetrachloride are obtained in 60% yield 3 - amino - 4 - (α,α,α - trifluoro - m-tolyl)-furoxan, melting at 85°.

When this substance is melted or when a solution of this substance in toluene is heated under reflux for 2 hours or when a solution of this substance in dioxan is irradiated at 10° by UV-light, it transforms quantitatively to the isomeric 4 - amino - 3 - (α,α,α - trifluoro-m-tolyl)-furazan, melting at 150°.

What is claimed is:
1. A compound of the formula

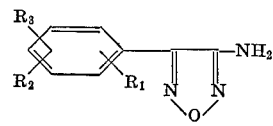

wherein
$R_1$ is halogen, nitro, trifluoromethyl, lower alkoxy or lower alkylthio;
$R_2$ is hydrogen, lower alkyl, or lower alkoxy;
$R_3$ is hydrogen or lower alkoxy.

2. A compound as defined in claim 1 wherein said compound is 3-amino-4-(p-chlorophenyl) furazan.

3. A compound as defined in claim 1 wherein said compound is 3-amino-4-(α,α,α-trifluoro-o-tolyl) furazan.

4. A compound as defined in claim 1 wherein said compound is 3-amino-4-(o-methoxyphenyl) furazan.

5. A compound as defined in claim 1 wherein said compound is 3-amino-4-(3,4,5-trimethoxyphenyl) furazan.

6. A compound as defined in claim 1 wherein said compound is 3-amino-4-(α,α,α-trifluoro-m-tolyl) furazan.

7. A compound as defined in claim 1 wherein said compound is 3-amino-4-(o-fluorophenyl) furazan.

8. A compound as defined in claim 1 wherein said compound is 3-amino-4-(o-chlorophenyl) furazan.

9. A compound as defined in claim 1 wherein said compound is 3-amino-4-(o-nitrophenyl) furazan.

References Cited

UNITED STATES PATENTS

Ponzio et al.: C.A. 22, 1972′ (1928).

ALEX MAZEL, Primary Examiner

R. V. RUSH, Assistant Examiner

U.S. Cl. X.R.

424—272